United States Patent
Chacko et al.

(10) Patent No.: US 10,235,141 B2
(45) Date of Patent: Mar. 19, 2019

(54) METHOD AND SYSTEM FOR PROVIDING SOURCE CODE SUGGESTION TO A USER IN REAL-TIME

(71) Applicant: HCL Technologies Limited, Uttar Pradesh (IN)

(72) Inventors: Simy Chacko, Telangana (IN); Suresh Naidu P, Telangana (IN); Shiva Kumar Sholayappan, Telangana (IN); S U M Prasad Dhanyamraju, Telangana (IN)

(73) Assignee: HCL TECHNOLOGIES LTD. (IN)

( * ) Notice: Subject to any disclaimer, the term of this patent is extended or adjusted under 35 U.S.C. 154(b) by 0 days.

(21) Appl. No.: 15/609,379

(22) Filed: May 31, 2017

(65) Prior Publication Data

US 2017/0371629 A1 Dec. 28, 2017

(30) Foreign Application Priority Data

Jun. 28, 2016 (IN) .............................. 201611022112

(51) Int. Cl.
*G06F 8/36* (2018.01)
*G06F 8/20* (2018.01)
*G06F 8/35* (2018.01)
*G06F 8/71* (2018.01)

(52) U.S. Cl.
CPC .................. *G06F 8/36* (2013.01); *G06F 8/20* (2013.01); *G06F 8/35* (2013.01); *G06F 8/71* (2013.01)

(58) Field of Classification Search
None
See application file for complete search history.

(56) References Cited

U.S. PATENT DOCUMENTS

| 9,195,440 B2 | 11/2015 | Adams et al. | |
| 9,619,211 B2 | 4/2017 | McCollum et al. | |
| 2011/0191747 A1* | 8/2011 | Charisius | G06F 8/20 717/103 |
| 2011/0197178 A1* | 8/2011 | Johnston | G06F 8/33 717/123 |

(Continued)

FOREIGN PATENT DOCUMENTS

WO 2015105498 A1 7/2015

OTHER PUBLICATIONS

Bruch et al. "Learning from Examples to Improve Code Completion Systems" ESEC-FSE, Aug. 23-28, 2009, ACM, Amsterdam, The Netherlands.

*Primary Examiner* — Wynuel S Aquino
(74) *Attorney, Agent, or Firm* — Hayes Soloway P.C.

(57) ABSTRACT

Disclosed is a system for providing source code suggestion to a user in real-time. A mining module mines source code information, pre-stored in a source code repository, to create a reference model. A code receiving module receives input lines of code from a user, via a User Interface, in real-time. A mapping module maps the one or more parameters with the metadata corresponding to each source code block stored in the reference model. A code suggestion module identifies one or more target source code blocks from the plurality of source code blocks. The code suggestion module suggests at least one target source code block, of the one or more target source code blocks, to be populated in the input lines of code thereby providing the source code suggestion to a user in real-time.

14 Claims, 3 Drawing Sheets

(56) References Cited

U.S. PATENT DOCUMENTS

2015/0277860 A1\* 10/2015 Hur .......................... G06F 8/36
                                                                         717/110
2016/0124720 A1\*  5/2016 Beckwith .................. G06F 8/33
                                                                         717/113

\* cited by examiner

METHOD AND SYSTEM FOR PROVIDING SOURCE CODE SUGGESTION TO A USER IN REAL-TIME

PRIORITY INFORMATION

The present application claims priority from Indian Patent Application No. 201611022112 filed on 28 Jun. 2016, the entirety of which is hereby incorporated by reference.

TECHNICAL FIELD

The present disclosure described herein, in general, relates to a system and method for providing source code suggestion to a user in real-time.

BACKGROUND

Traditionally, all software development activities are completely driven by coding. Even though software developers have good technical skills, majority of the challenges faced by the software developers may include, but not limited to, significant effort on writing code, code reusability, duplicating code blocks, source code implementation sharing within large team, knowledge reference, and applicable code blocks auto fill. It may be noted that most of the Integrated Development Environments (IDE's) are capable of providing intelligence that is only limited to syntax suggestions, minimal code references but often it does not help the software developers in expediting the coding activities.

It has been observed that most of the times the software developers may write the code as per their experience or by referring language reference for new/known implementations. But rarely the software developers refers existing code base. The existing code base is referred by the software developers only when similar type of code is already available in the existing code base, so that the software developers may use same approach or code as such code is already being tested. It has been further observed that most of the software developers refer sources like searching in Google™, language reference, trial and error with minimal intelligence provided by IDE. This may lead in increasing the overall turnaround time of the project due to the increase in the additional irrelevant code blocks as the software developers may unnecessarily write lengthy code.

Though there are multiple analytical tools available that does static analysis of the existing code base and suggests code metrics but such analytical tools are available as an offline process that does not assist the software developer during runtime to take necessary steps while coding in order to expedite the coding activities.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts for providing source code suggestion to a user in real-time and the concepts are further described below in the detailed description. This summary is not intended to identify essential features of the disclosure nor is it intended for use in determining or limiting the scope of the disclosure.

In one implementation, a system for providing source code suggestion to a user in real-time is disclosed. In one aspect, the system may comprise a processor and a memory coupled to the processor. The processor may execute a plurality of modules stored in the memory. The plurality of modules may comprise a mining module, a code receiving module, a parameter determining module, a mapping module, and a code suggestion module. The mining module may mine source code information, pre-stored in a source code repository, to create a reference model. In one aspect, the reference model may store a plurality of source code blocks and metadata corresponds to each source code block. The code receiving module may receive input lines of code from a user, via a User Interface, in real-time. The parameter determining module may determine one or more parameters corresponding to the input lines of code. The mapping module may map the one or more parameters with the metadata corresponding to each source code block stored in the reference model. The one or more parameters may be mapped with the metadata in order to determine a matching score for each source code block mapped with the one or more parameters. The code suggestion module may identify one or more target source code blocks from the plurality of source code blocks. In one aspect, the one or more target source code blocks may be identified based on the matching score. The code suggestion module may further suggest at least one target source code block, of the one or more target source code blocks, to be populated in the input lines of code thereby providing the source code suggestion to a user in real-time.

In another implementation, a method for providing source code suggestion to a user in real-time is disclosed. In order to provide the source code suggestion to the user in real-time, initially, source code information, pre-stored in a source code repository, may be mined to create a reference model. In one aspect, the reference model may store a plurality of source code blocks and metadata corresponds to each source code block. Upon mining the source code information, input lines of code from a user may be received, via a User Interface, in real-time. Subsequent to the receipt of the input lines of code, one or more parameters may be determined corresponding to the input lines of code. After determining the one or more parameters, the one or more parameters may be mapped with the metadata corresponding to each source code block stored in the reference model. In one aspect, the one or more parameters may be mapped with the metadata in order to determine a matching score for each source code block mapped with the one or more parameters. Subsequently, one or more target source code blocks may be identified from the plurality of source code blocks. In one aspect, the one or more target source code blocks may be identified based on the matching score. After identifying the one or more target source code blocks, at least one target source code block, of the one or more target source code blocks, to be populated may be suggested in the input lines of code thereby providing the source code suggestion to a user in real-time. In one aspect, the aforementioned method for providing the source code suggestion to the user in real-time is performed by a processor using programmed instructions stored in a memory.

In yet another implementation, non-transitory computer readable medium embodying a program executable in a computing device for providing source code suggestion to a user in real-time is disclosed. The program may comprise a program code for a program code for mining source code information, pre-stored in a source code repository, to create a reference model, wherein the reference model storing a plurality of source code blocks and metadata corresponds to each source code block. The program may further comprise a program code for receiving input lines of code from a user, via a User Interface, in real-time. The program may further comprise a program code for determining one or more parameters corresponding to the input lines of code. The program may further comprise a program code for mapping the one or more parameters with the metadata corresponding to each source code block stored in the reference model, wherein the one or more parameters are mapped with the metadata in order to determine a matching score for each source code block mapped with the one or more parameters. The program may further comprise a program code for identifying one or more target source code blocks from the plurality of source code blocks, wherein the one or more target source code blocks are identified based on the matching score. The program may further comprise a program code for suggesting at least one target source code block, of the one or more target source code blocks, to be populated in the input lines of code thereby providing the source code suggestion to a user in real-time.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

Figure 1:
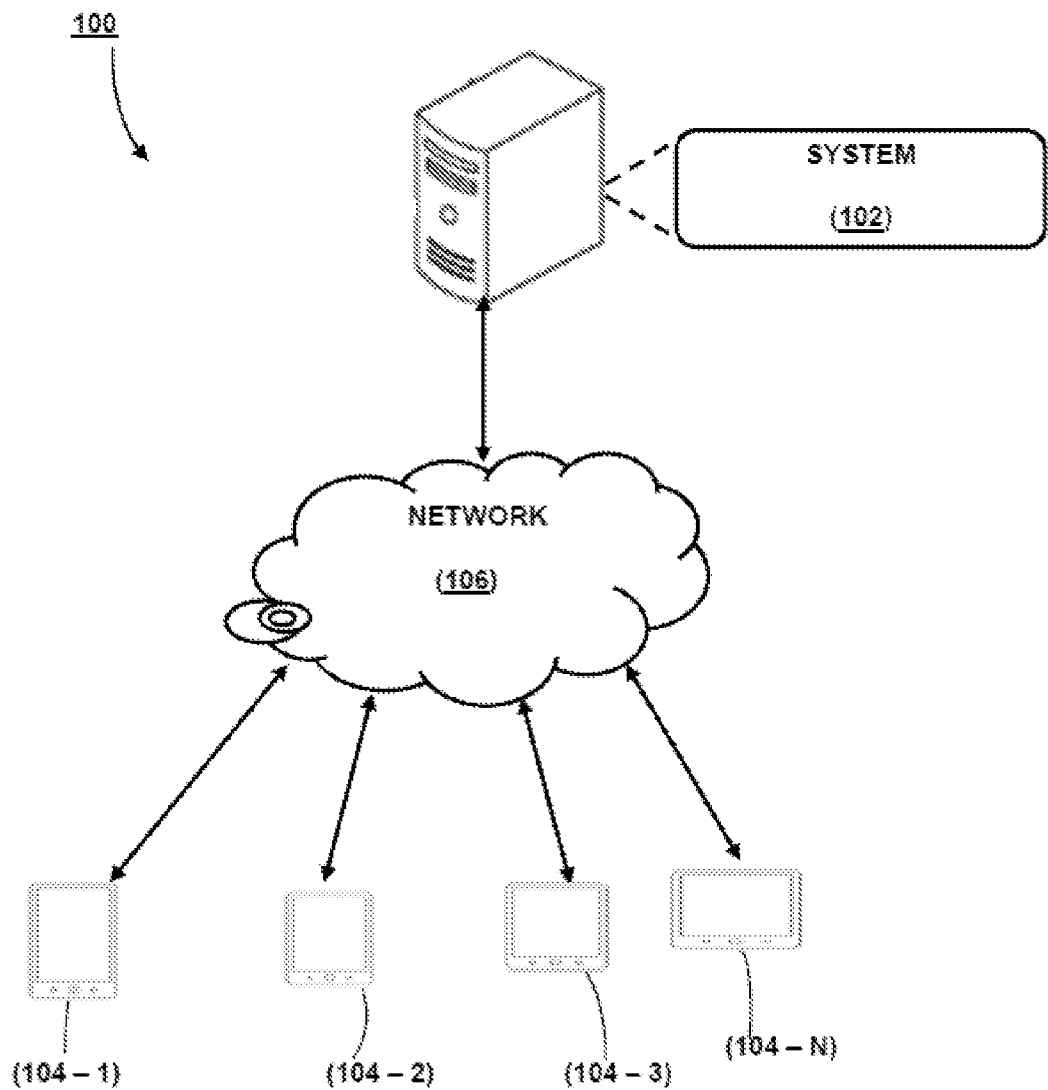
FIG. 1 illustrates a network implementation of a system for providing source code suggestion to a user in real-time is shown, in accordance with an embodiment of the present disclosure.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. For example, although the present disclosure will be described in the context of a system and method for system for providing source code suggestion to a user in real-time, one of ordinary skill in the art will readily recognize that the method and system can be utilized in any situation where there is need to provide the source code suggestion to the user in real-time. Thus, the present disclosure is not intended to be limited to the embodiments illustrated, but is to be accorded the widest scope consistent with the principles and features described herein.

The present system and method facilitates a system and a method for providing source code suggestion to a user (hereinafter also referred to as a software developer) in real-time. The present system and method relates to address typical challenges observed to expedite the software development process by providing intelligent way of source code suggestions, so that the software developer may identify the required and appropriate code to be placed or use from existing references. This system and method further facilitates the software developer to identify, refer, and re-use existing applicable code blocks from the existing references and auto populate applicable code blocks in an intelligent manner.

In order to re-use the existing applicable blocks from the existing references, the present system performs offline learning from the existing references and converts the offline learning into a reference model that may be queried against by an Integrated Development Environment (IDE) at the run time. It may be understood that the offline learning from the existing references may be performed by mining source code information, pre-stored in a source code repository. In one aspect, the reference model may be queried to provide real-time information, to the software developer, in order to expedite the software development process. It may be understood that the reference model may be queried while the software developer is writing input lines of code, via a User Interface of the IDE, in real-time.

Upon receiving the input lines of code, one or more parameters may be determined corresponding to the input lines of code. Subsequent to the determination of the one or more parameters, the one or more parameters may be mapped with the metadata corresponding to each source code block stored in the reference model. In one aspect, the one or more parameters may be mapped with the metadata in order to determine a matching score for each source code block mapped with the one or more parameters. After determining the matching score, one or more target source code blocks may be identified from the plurality of source code blocks. In one aspect, the one or more target source code blocks may be identified based on the matching score.

Thereafter at least one target source code block, of the one or more target source code blocks, may be suggested. It may be understood that the at least one target source code block suggested is to be populated in the input lines of code. In one embodiment, the software developer may then be enabled to select a target source code block of the at least one target source code block for populating in the input lines of code. Thus, in this manner, the source code suggestion may be provided to the software developer, on the IDE, in real-time for expediting the software development process.

While aspects of described system and method for providing the source code suggestion to the user in real-time and may be implemented in any number of different computing systems, environments, and/or configurations, the embodiments are described in the context of the following exemplary system.

Referring now to FIG. 1, a network implementation 100 of a system 102 for providing source code suggestion to a user in real-time is disclosed. In order to provide the source code suggestion, initially, the system 102 mines source code information, pre-stored in a source code repository, to create a reference model. In one aspect, the reference model may store a plurality of source code blocks and metadata corresponds to each source code block. Upon mining the source code information, the system 102 receives input lines of code from a user, via a User Interface, in real-time. Subsequent to the receipt of the input lines of code, the system 102 determines one or more parameters corresponding to the input lines of code. After determining the one or more parameters, the system 102 maps the one or more parameters with the metadata corresponding to each source code block stored in the reference model. In one aspect, the one or more parameters may be mapped with the metadata in order to determine a matching score for each source code block mapped with the one or more parameters. Subsequently, the system 102 identifies one or more target source code blocks from the plurality of source code blocks. In one aspect, the one or more target source code blocks may be identified based on the matching score. After identifying the one or more target source code blocks, the system 102 suggests at least one target source code block, of the one or more target source code blocks, to be populated in the input lines of code thereby providing the source code suggestion to a user in real-time.

Although the present disclosure is explained considering that the system 102 is implemented on a variety of computing systems, such as a laptop computer, a desktop computer, a notebook, a workstation, a mainframe computer, a server, a network server, a cloud-based computing environment and the like. It will be understood that the system 102 may be accessed by multiple users through one or more user devices 104-1, 104-2, 104-3, 104-N. In one implementation, the system 102 may comprise the cloud-based computing environment in which a user, interchangeably may referred to as a consumer, may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
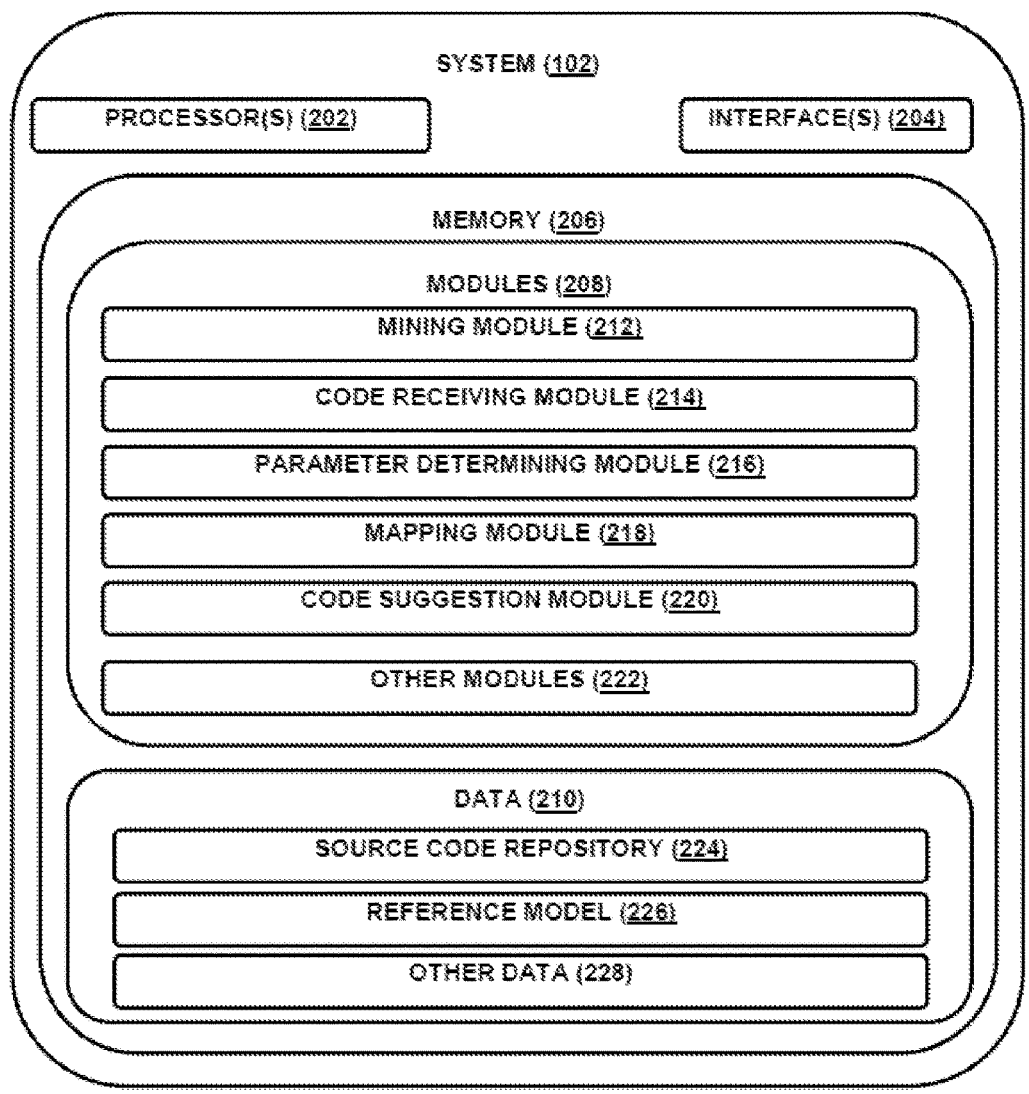
FIG. 2 illustrates the system, in accordance with an embodiment of the present disclosure.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a mining module 212, a code receiving module 214, a parameter determining module 216, a mapping module 218, a code suggestion module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a source code repository 224, a reference model 226 and other data 228. The other data 228 may include data generated as a result of the execution of one or more modules in the other modules 222. The detailed description of the modules 208 along with other components of the system 102 is further explained by referring to FIG. 2.

In one implementation, at first, a user may use the user device 104 to access the system 102 via the I/O interface 204. The user may register themselves using the I/O interface 204 in order to use the system 102. In one aspect, the user may accesses the I/O interface 204 of the system 102 for providing source code suggestion to a user in real-time, the system 102 may employ the plurality of modules i.e. the mining module 212, the code receiving module 214, the parameter determining module 216, the mapping module 218, and the code suggestion module 220. The detailed working of the plurality of modules is described below.

The mining module 212 mines source code information, pre-stored in a source code repository 224, to create a reference model 226. In one aspect, the reference model 226 may store a plurality of source code blocks and metadata corresponds to each source code block. In one aspect, the mining module 212 stores the plurality of source code blocks in the reference model 226 upon categorizing the plurality of source code blocks into at least one category comprising declaration, initialization, instantiation, exceptions handled, usage, return type, and call-flow. In one aspect, the mining module 212 mines the source code information by parsing the source code information in order to determine the plurality of source code blocks. Upon parsing the source code information, the mining module 212 further analyzes the plurality of source code blocks in order to create the reference model 226. The reference model 226 comprises the metadata corresponding to each source code block. In one embodiment, the plurality of source code blocks may be analyzed by using a machine learning technique. Examples of the machine learning technique may include, but not limited to, classification, clustering, and association rules. The plurality of source code blocks, on the other hand, comprises namespaces, class, functions, variables, literals, key words.

Subsequent to the mining the source code information, the code receiving module 214 receives input lines of code from a user, via a User Interface (UI), in real-time. It may be understood that in order to provide source code suggestion to the user in real-time, initially, the input lines of code may be received from the UI of an Integrated Development Environment (IDE). The IDE is a front end UI that facilities the user to write code pertaining to a specific software development. After receiving the input lines of code, the parameter determining module 216 determines one or more parameters corresponding to the input lines of code. The one or more parameters may include, but not limited to, function sequence calls, function definition patterns, naming conventions, function execution sequence, return type, exception handling patterns, callback handling patterns, inheritance patterns, comment, control statements.

The mapping module 218 may then maps the one or more parameters with the metadata corresponding to each source code block stored in the reference model 226. In one aspect, the one or more parameters may be mapped with the metadata in order to compute a matching score for each source code block mapped with the one or more parameters. In one aspect, the matching score may be computed based on the following steps:

At step 1, the entire source code is tokenized into various code elements i.e. namespace, class, interface, function, variables, literals, keywords, lines, comments.

At step 2, each identified code element is mapped with its respective offset values to identify the occurrence and location.

At step 3, each code element is further tokenized to extract the co-occurrence of words like "read file", "write file", "open connection" and the like.

At step 4, each code source block is classified into multiple buckets such as declaration, initialization, instantiation, exception handler, usage, return type, variable, literals (if any).

At step 5, each operation mentioned in step 4, the co-occurrence is calculated in the form of matrix against each referenced elements (loops, operators, function, etc.) defined earlier, especially for variables and objects and stored in the form of matrix, show below For example:

|  | for | + | * | openConnection | readFile |
|---|---|---|---|---|---|
| i | 1 | 0 | 0 | 0 | 0 |
| j | 1 | 1 | 0 | 0 | 0 |
| strFile | 0 | 0 | 0 | 0 | 1 |
| myVal | 0 | 1 | 1 | 0 | 0 |
| retVal | 0 | 0 | 0 | 1 | 1 |
| url | 0 | 0 | 0 | 0 | 1 |
| objConnection | 0 | 0 | 0 | 1 | 0 |

At step 6, as described in step 5, all the tokenized words (extracted from literals, class, filename, comments) are mapped against their respective code elements and stored in the form of a matrix, show below.

For example:

|  | readFile | writeFile | myClass | Comments | DBConnetion |
|---|---|---|---|---|---|
| read | 1 | 0 | 0 | 0 | 0 |
| write | 1 | 1 | 0 | 0 | 0 |
| call | 0 | 0 | 0 | 0 | 1 |
| ajax | 0 | 1 | 1 | 0 | 0 |
| callback | 0 | 0 | 0 | 1 | 1 |
| get | 0 | 0 | 0 | 0 | 1 |
| set | 0 | 0 | 0 | 1 | 0 |

At step 7, the callflow information is captured like who is calling whom along with their offset values and stored in the form of a matrix, as shown below.

For example:

|  | readFile | writeFile | openConnection | getConnection | getUserData | saveUserData | deleteUserData |
|---|---|---|---|---|---|---|---|
| readFile | 0 | 1 | 0 | 0 | 0 | 0 | 0 |
| writeFile | 1 | 0 | 0 | 0 | 0 | 0 | 0 |
| openConnection | 0 | 0 | 0 | 1 | 1 | 1 | 1 |
| getConnection | 0 | 0 | 1 | 0 | 1 | 1 | 1 |
| getUserData | 0 | 0 | 1 | 1 | 0 | 0 | 0 |
| saveUserData | 0 | 0 | 1 | 1 | 1 | 0 | 0 |
| deleteUserData | 0 | 0 | 1 | 1 | 1 | 0 | 0 |

At step 8, at run time the input lines of code is captured along with other metadata information i.e. Class Name (if Any), Function Name (if any), comments (if any). This input lines of code are then converted into a vector and queried against each stored matrix for similarity score using one of a suitable measure that may include, but not limited to, a Euclidean Distance, a Squared Euclidean Distance, a Normalized Squared Euclidean Distance, a Manhattan Distance, a Chessboard Distance, Bray Curtis Distance, a Canberra Distance, Cosine Distance, a Correlation Distance, a Binary Distance, and a Time Warping Distance.

Thus, in this manner, the matching score may be computed for each source code block. Subsequent to the computation of the matching score, the code suggestion module 220 identifies one or more target source code blocks from the plurality of source code blocks. The one or more target source code blocks may be identified based on the matching score.

After identifying the one or more target source code blocks, the code suggestion module 220 further suggests at least one target source code block, of the one or more target source code blocks, to be populated in the input lines of code. In one embodiment, upon identification of the one or more target source code blocks, the code suggestion module 220 enables the user to select a target source code block of the at least one target source code block. Once the target source block is selected by the user, the code suggestion module 220 populates the target source code block in the input lines of code. Thus, in this manner, the source code suggestion may be provided to the user, on the IDE, in real-time for expediting the specific software development.

In order elucidate the functioning of the system 102, consider a set of examples where the system 102 provides the source code suggestion based on the input lines of code received from the user.

Example 1: Similar/Duplicate Code Blocks

It may be understood that the below mentioned source code blocks (as source code information) are stored in the source code repository 224.

| Example1 | Example2 | Example3 |
|---|---|---|
| //Example1: Adding two numbers<br>Function addNumbers( ) {<br>var i=0,j=0;<br>var k=i+j<br>print k;<br>} | //Example2: Adding two numbers<br>Function addNumbers( ) {<br>var i=0,j=0;<br>var k=i+j<br>print k;<br>} | //Example3: code to add two integers<br>Function numberAdd( ) {<br>var mynum1 = 0;<br>var mynum2 = 0;<br>var sum = mynum1 + mynum2;<br>print sum;<br>} |

The system 102 mines the source code information by parsing the existing code base to identify and cluster the entire set codes into logical similar and duplicate source code blocks. It may be understood that the source code blocks which is exactly same are marked as 'Duplicate Blocks' whereas the source code blocks which logically resembles same but with different variable names or logical sequence as marked as 'Similar'. In the above example, since the source code blocks pertaining to Example1 and Example2 are 'Duplicate Blocks' therefore both the Example1 and Example2 are marked as 'Duplicate Blocks'. Similarly the source code blocks pertaining to Example3 is similar to Example1 and Example2. Therefore Example3 is marked as 'Similar' to Example1 and Example2.

After mining the source code information, the input lines of code (mentioned below) are received by the user in real-time. Upon receiving the input lines of code, the system 102 maps the one or more parameters pertaining to the input lines of code (i.e. such as function name, variable name, and return type) with the metadata (comprising function name, variable name, and return type) corresponding to each source code block (i.e. Example1, Example2, 'Example3).

Upon the mapping, the system 102 provides the source code suggestion, as mentioned in the below table.

| Function add Numbers( )<br>{<br>var num1 = 0;<br>var num2 = 0;<br>var sum = num1 + num2;<br>print sum;} | Input lines of code received by the user<br><br><br>Source code suggestion provided by the system 102 |
|---|---|

Thus, in this manner, the source code suggestion may be provided to the user, on the IDE, in real-time. In the above example, the system 102 provides the source code suggestion upon identifying literals and variables names associated to the input lines of code. The system 102 then tokenizes all the words (including the literals and variables names identified) by applying at least one of a Camel case separation technique, a Stop words removal technique, and a Stemming technique. For instance, in Example1 and Example2, upon tokenization, it may be noted that the words 'add' and 'number' are common in both addNumbers( ) and numberAdd( ). Therefore the system 102 may identify addNumbers( ) and numberAdd( ) as similar functions and thus provides the source code block, pertaining the numberAdd( ), as suggestion to the user.

Example 2: Function Definition Patterns

It may be understood that the below source code information is stored in the source code repository 224.

| Example1 | Example2 |
|---|---|
| //subclass1 extending baseclass<br>Class subclass1( ) extends basecalss {<br>    Public override method1( ){<br>    ……<br>}<br>Public method2( ){<br>    ……<br>}<br>} | //subclass2 extending baseclass<br>Class subclass2( ) extends basecalss {<br>    Public override method1( ){<br>    ……<br>}<br>Public method3( ){<br>    ……<br>}<br>} |

The system 102 mines the source code information by parsing the existing code base to identify and cluster the entire set codes into logical similar and duplicate source code blocks. The system 102 then identifies common code blocks from the common function. This is achieved by identifying the common methods derived from the same base class and having different implementation (such as 'overriding').

After mining the source code information, the input lines of code (mentioned below) are received by the user in real-time. Upon receiving the input lines of code, the system 102 maps the one or more parameters pertaining to the input lines of code (i.e. such as sub class name, base class name, and return type) with the metadata (comprising sub class name, base class name, and return type) corresponding to each source code block (i.e. Example1 and Example2). Upon the mapping, the system 102 provides the source code suggestion to the user, as mentioned below.

| Class subclass3( ) extends basecalss { Public override method1( ){ ...... } | Input lines of code received by the user Source code suggestion provided by the system 102 |
|---|---|

Example 3: Function Execution Sequence/Referenced Blocks

It may be understood that the below source code information is stored in the source code repository 224.

| //Defined data structures are Role, Permission Function getRoles( ){ DataSet ds = getRolesDataFromDB("Roles"); displayInUI(ds); } |
|---|

The system 102 mines the source code information by parsing the existing code base to identify function calls (call-flow—caller called) relationship. It may be understood that a score is computed and thereby assigned to each function is mapped against other function as a next call. The function with the highest score is suggested, by the system 102, for a given function (as mentioned below).

| //Defined data structures are Role, Permission Function getPermissions( ){ DataSet ds = getDataFromDB("Permissions"); displayInUI(ds); } | Input lines of code received by the user Source code suggestion provided by the system 102 |
|---|---|

Example 4: Pattern Mining a) Exception handling patterns: It may be understood that exception handling patterns are extracted and auto-populated against implemented class and type. Each exception is mapped against their respective types and their probability of adding the exceptions block. This probability mapping is stored as a model and upon using any of the type reference, the mapped exception block is populated which has the highest probability.

a) Callback handling patterns: It may be understood that the callback function is auto populated based on the type specified in the caller function. For instance, whenever a function "A" with callback function "C" is declared and consider that the function "A" is getting called with the callback function "D" then the system 102 detects that as a callback function with no definition of "D" then populate the callback function "D".

Example 5: Comments

It may be understood that each source code block is mapped as similar or duplicate based on function names, references used, logical operations performed. In addition, a weight may also be given to the comments used within the blocks during score computation. In order to provide suggestion, the comments sections may be parsed and tokenized and stored against each source code block. At run time, if a user starts with a comment block and if that matches with the existing source code block with the similar comments (based on the score computed), the system 102 suggests the source code block with the highest score.

For instance, consider the comments (1) "//adding two numbers" and comment (2) "//code to add two integers" stored in the stored in the source code repository 224. Now if the input lines of code, received from the user, starts with "addition of two numbers" then the comment (3) is mapped against comment (1) and comment (2) in order to determine a matching score. Upon mapping, it may be understood that comment (1) has a 90% score against comment (3) and comment (2) has 88% score against comment (3) then comment (1) may be suggested by the system 102.

Example 6: Predict Next Statement for Variables

It may be understood that each variable is identified by its unique name or the type of operations to be performed on the variable. So, all the possible operations are widely categorized into the base functions available in the existing code base. Example of the operations may include, but not limited to, file operations, Arithmetic operations, and Ajax call operation. In one aspect, when any variable is used in a manner which describes its functionality by the variables's name then the possible operations against the usage is suggested based on the score computed and thereby assigned to each variable. For instance, consider the below source code information is stored in the source code repository 224.

| Function 1 | Function 2 |
|---|---|
| //reading contents from file var strFile="D:\xxx\aaa.txt"; File objFile = new File(strFile); objFile.Open( ); objFile.read( ); objFile.close( ); | //copy contents from one file to another var strFile1="D:\xxx\aaa.txt"; var strFile2="D:\xxx\bbb.txt"; File objFile = new File(strFile1); objFile.Copy(strFile2); objFile.close( ); |

It may be understood that the variable name "strFile" may be linked to file operation based on its similarity with "File Operation". Therefore the "File Operation" related methods may be suggested when variable related to "File Operation" is received in the input lines of code from the user, as shown below.

When the variable name is received as "fileToRead"

| Function readFile( ) { var fileToRead = "C:\temp\log.txt"; File objFile = new File(fileToRead); objFile.Open( ); objFile.read( ); objFile.close( ); } | Input lines of code received by the user Source code suggestion provided by the system 102 upon referring to Function 1 |
|---|---|

When the variable name is received as "srcFile"

| Function copyFile( ) { var srcFile="C:\temp\log.txt", destFile="C:\temp\log1.txt"; | Input lines of code received by the user |
|---|---|

```
File objFile = new File(srcFile);      Source code suggestion provided by the
objFile.Copy(destFile);                system 102 upon referring to Function 2
srcFile.close( );
}
```

Example 7: Predict from Values in Variables

It may be understood that instead of the variable name, the values may be considered. Based on the value associated with the variable name, the mapping may be identified to perform next action. For instance, consider the variable name "var URL" contains value "http://abc.aaa.com/?a=1111". In one aspect, the value may be identified as a URL based on the predefined rules and the value may be mapped against "HTTP Operations". For instance, consider the below source code information is stored in the source code repository 224.

```
//Http request... on response callback function
var strURL="http://servername/getEventsData";
function InvokeRequestEvents(strURL,requestObject,
callbackfunction)
{
    httpRequest request = new httpRequest( );
    request.send(requestObject);
    OnSuccess( )
    {
     callbackfunction(responseObject);
    }
     OnError( ){ logException(ex); }
}
```

Upon receiving the input lines of code mentioned below, the system 102 may suggest the source code block based on the value of the variable upon taking reference of the source code information stored in the source code repository 224.

```
var strURL="http://servername/getAnyData";   Input lines of code received
function InvokeRequestData...                by the user
...(strURL,requestObject, callbackfunction)  Source code suggestion
{                                            provided by the system 102
httpRequest request = new httpRequest( );
request.send(requestObject);
OnSuccess( ){
callbackfunction(responseObject);}
OnError( ){logException(ex);}
}
```

Thus, based on the information received in the input lines of code (i.e. class name, function name, comments added, line statement in question), the available models are queried against and the best possible next step is suggested by the system 102 based on the score computed against the various models.

Figure 3:
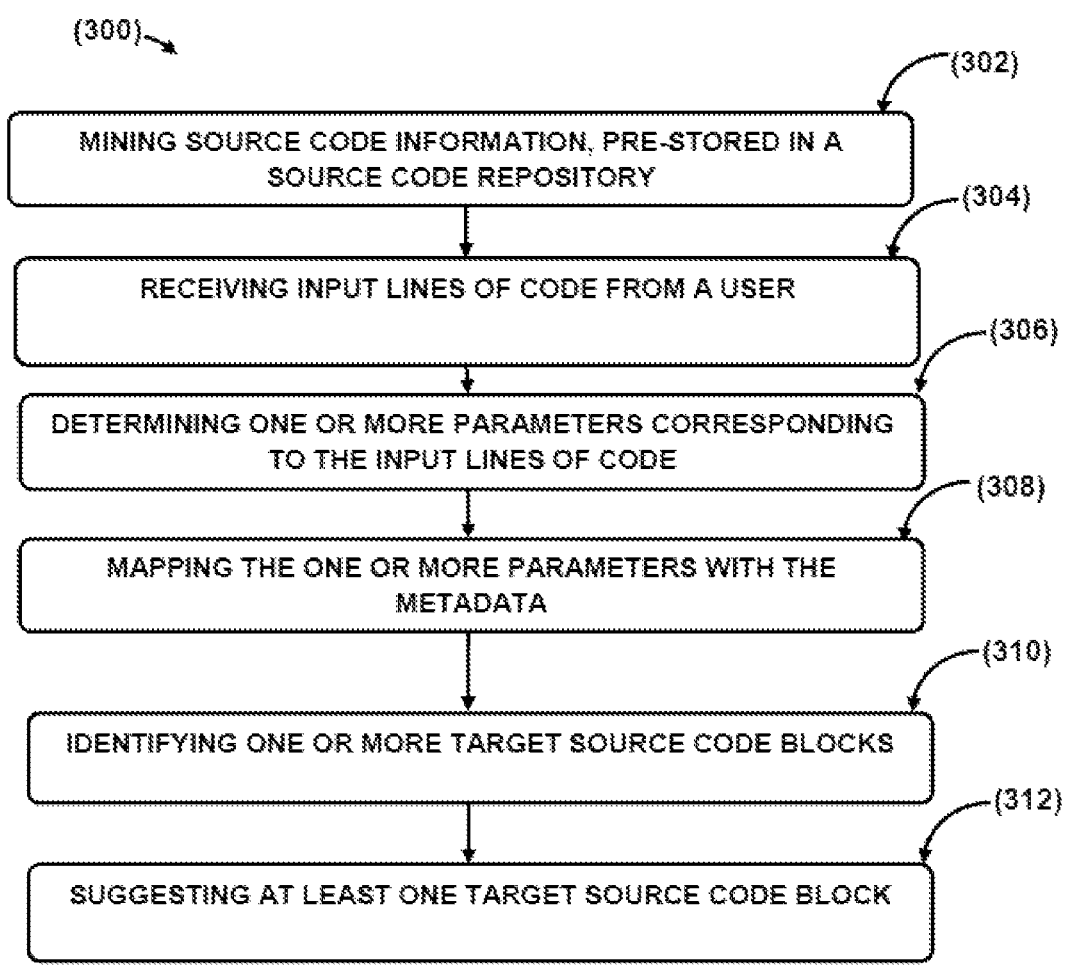
FIG. 3 illustrates a method for providing the source code suggestion to the user in real-time, in accordance with an embodiment of the present disclosure.

Referring now to FIG. 3, a method 300 for providing source code suggestion to a user in real-time is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described in the system 102.

At block 302, source code information, pre-stored in a source code repository 224, may be mined to create a reference model 226. In one aspect, the reference model 226 storing a plurality of source code blocks and metadata corresponds to each source code block. In one implementation, the source code information may be mined by the mining module 212.

At block 304, input lines of code may be received from a user, via a User Interface, in real-time. In one implementation, the input lines of code may be received by the code receiving module 214.

At block 306, one or more parameters corresponding to the input lines of code may be determined. In one implementation, the one or more parameters may be determined by the parameter determining module 216.

At block 308, the one or more parameters may be mapped with the metadata corresponding to each source code block stored in the reference model. In one aspect, the one or more parameters are mapped with the metadata in order to determine a matching score for each source code block mapped with the one or more parameters. In one implementation, the one or more parameters may be mapped with the metadata by the mapping module 218.

At block 310, one or more target source code blocks may be identified from the plurality of source code blocks. In one aspect, the one or more target source code blocks are identified based on the matching score. In one implementation, the one or more target source code blocks may be identified by the code suggestion module 220.

At block 312, at least one target source code block, of the one or more target source code blocks, to be populated in the input lines of code may be suggested thereby providing the source code suggestion to a user in real-time. In one implementation, the at least one target source code block may be suggested by the code suggestion module 220.

Exemplary embodiments discussed above may provide certain advantages. Though not required to practice aspects of the disclosure, these advantages may include those provided by the following features.

Some embodiments enable a system and a method to provide an intelligent way of source code suggestions that may help a software developer to identify the required and appropriate code to be placed or use from existing references of source code blocks.

Some embodiments enable a system and a method to facilitate auto fill applicable code blocks by understanding the various coding patterns from the existing references of source code blocks.

Although implementations for methods and systems for providing source code suggestion to a user in real-time have been described in language specific to structural features and/or methods, it is to be understood that the appended claims are not necessarily limited to the specific features or methods described. Rather, the specific features and methods are disclosed as examples of implementations for providing the source code suggestion to the user in real-time.

We claim:

1. A method for providing source code suggestion to a user in real-time, the method comprising:
   mining, by a processor, source code information, pre-stored in a source code repository, to make a system learn in an offline mode;
   creating, based on the learning, a reference model, wherein the reference model is created upon parsing and analyzing the source code information by using a machine learning technique, and wherein the reference model storing a plurality of source code blocks and metadata corresponds to each of the plurality of source code blocks upon categorizing the plurality of source code blocks into at least one category;
   receiving, by the processor, input lines of code from a user, via a User Interface, in real-time;
   determining, by the processor, one or more parameters corresponding to the input lines of code;
   mapping, by the processor, the one or more parameters with the metadata corresponding to each of the plurality of source code blocks stored in the reference model, wherein the one or more parameters are mapped with the metadata;
   determine a matching score for each of the plurality of source code blocks mapped with the one or more parameters, and wherein the matching score indicates a similarity between the input lines of code and the plurality of source code blocks;
   identifying, by the processor, one or more target source code blocks from the plurality of source code blocks, wherein the one or more target source code blocks are identified based on the matching score; and
   suggesting, by the processor, at least one target source code block, of the one or more target source code blocks, having a highest score; populating in the input lines of code in accordance with the one or more parameters used by the user in the input lines of code the suggested at least one target source code block;
   providing, based upon the populating, the suggested at least one target source code block to a user in real-time;
   selecting, by the user, the suggested at least one target source code block and populating, by the processor, the suggested at least one target source code block in the input lines of code of the User Interface.

2. The method of claim 1, wherein the mining further comprising:
   parsing, by the processor, the source code information in order to determine the plurality of source code blocks; and
   analyzing, by the processor, the plurality of source code blocks to create the reference model comprising the metadata corresponding to each source code block, wherein the plurality of source code blocks is analyzed by using a machine learning technique.

3. The method of claim 2, wherein the plurality of source code blocks comprises namespaces, class, functions, variables, literals, key words.

4. The method of claim 2, wherein the machine learning technique is one of a classification, clustering, and association rules.

5. The method of claim 1, wherein the one or more parameters comprise function sequence calls, function definition patterns, naming conventions, function execution sequence, return type, exception handling patterns, callback handling patterns, inheritance patterns, comment, control statements.

6. The method of claim 1 further comprising categorizing, by the processor, the plurality of source code blocks into at least one category comprising declaration, initialization, instantiation, exceptions handled, usage, return type, and call-flow.

7. The method of claim 1, wherein the score is computed by one or more of a plurality of steps including,
   tokenizing:
      a plurality of source code blocks into a set of code elements, and
      each code element to extract co-occurrence of words;
   mapping each code element with an offset value in order to identify occurrence and location;
   classifying each source code block into a plurality of categories;
   computing co-occurrence of each code element;
   storing mapping of each word against one or more code elements in a matrix; and
   computing the score upon determining similarity between the input lines of code and the one or more code elements stored in the matrix, wherein the similarity is determined based on at least one distance computation method.

8. The method of claim 7, wherein the at least one distance computation method comprises at least one of: a Euclidean Distance, a Squared Euclidean Distance, a Normalized Squared Euclidean Distance, a Manhattan Distance, a Chessboard Distance, Bray Curtis Distance, a Canberra Distance, Cosine Distance, a Correlation Distance, a Binary Distance, or a Time Warping Distance.

9. A system for providing source code suggestion to a user in real-time, the system comprising:
   a processor; and
   a memory coupled to the processor, wherein the processor is capable of executing a plurality of modules stored in the memory, and wherein the plurality of modules comprising:
   a mining module for mining source code information, pre-stored in a source code repository, to make the system learn in an offline mode;
   a reference model created based on the learning, wherein the reference model is created upon parsing and analyzing the source code information by using a machine learning technique, and wherein the reference model storing a plurality of source code blocks and metadata corresponds to each of the plurality of source code blocks upon categorizing the plurality of source code blocks into at least one category;
   a code receiving module for receiving input lines of code from a user, via a User Interface, in real-time;
   a parameter determining module for determining one or more parameters corresponding to the input lines of code;
   a mapping module for mapping the one or more parameters with the metadata corresponding to each of the plurality of source code blocks stored in the reference model, wherein the one or more parameters are mapped with the metadata;
   a matching score determined for each of the plurality of source code blocks mapped with the one or more parameters, and wherein the matching score indicates a similarity between the input lines of code and the plurality of source code blocks; and a code suggestion module for:
  identifying one or more target source code blocks from the plurality of source code blocks, wherein the one or more target source code blocks are identified based on the matching score;
  suggesting at least one target source code block, of the one or more target source code blocks, having a highest score;
  populating in the input lines of code in accordance with the one or more parameters used by the user in the input lines of code the suggested at least one target source code block;
  providing, based upon the populating, the suggested at least one target source code block to a user in real-time; and
  selecting, by the user, the suggested at least one target source code block and populating, by the processor, the suggested at least one target source code block in the input lines of code of the User Interface.

10. The system of claim 9, wherein the mining module further:
  parse the source code information in order to determine the plurality of source code blocks; and
  analyze the plurality of source code blocks to create the reference model comprising the metadata corresponding to each source code block, wherein the plurality of source code blocks is analyzed by using a machine learning technique.

11. The system of claim 9, wherein the mining module further categorizes the plurality of source code blocks into at least one category comprising declaration, initialization, instantiation, exceptions handled, usage, return type, and call-flow.

12. The system of claim 9, wherein the score is computed by one or more of a plurality of steps including,
  tokenizing:
    a plurality of source code blocks into a set of code elements, and
    each code element to extract co-occurrence of words;
  mapping each code element with an offset value in order to identify occurrence and location;
  classifying each source code block into a plurality of categories;
  computing co-occurrence of each code element;
  storing mapping of each word against one or more code elements in a matrix; and
  computing the score upon determining similarity between the input lines of code and the one or more code elements stored in the matrix, wherein the similarity is determined based on at least one distance computation method.

13. The system of claim 12, wherein the at least one distance computation method comprises at least one of: a Euclidean Distance, a Squared Euclidean Distance, a Normalized Squared Euclidean Distance, a Manhattan Distance, a Chessboard Distance, Bray Curtis Distance, a Canberra Distance, Cosine Distance, a Correlation Distance, a Binary Distance, or a Time Warping Distance.

14. A non-transitory computer readable medium embodying a program executable in a computing device for providing source code suggestion to a user in real-time, the program comprising a program code:
  a program code for mining source code information, pre-stored in a source code repository, to make a system learn in an offline mode;
  a program code for creating, based on the learning, a reference model, wherein the reference model is created upon parsing and analyzing the source code information by using a machine learning technique, and wherein the reference model storing a plurality of source code blocks and metadata corresponds to each of the plurality of source code blocks upon categorizing the plurality of source code blocks into at least one category;
  a program code for receiving input lines of code from a user, via a User Interface, in real-time;
  a program code for determining one or more parameters corresponding to the input lines of code;
  a program code for mapping the one or more parameters with the metadata corresponding to each of the plurality of source code blocks stored in the reference model, wherein the one or more parameters are mapped with the metadata;
  a program code for determining a matching score for each of the plurality of source code blocks mapped with the one or more parameters, and wherein the matching score indicates a similarity between the input lines of code and the plurality of source code blocks;
  a program code for identifying one or more target source code blocks from the plurality of source code blocks, wherein the one or more target source code blocks are identified based on the matching score; and
  a program code for suggesting at least one target source code block, of the one or more target source code blocks, having a highest score;
  a program code for populating in the input lines of code in accordance with the one or more parameters used by the user in the input lines of code the suggested at least one target source code block;
  providing, based on the populating, the suggested at least one target source code block to a user in real-time; and
  selecting, by the user, the suggested at least one target source code block and populating, by the processor, the suggested at least one target source code block in the input lines of code of the User Interface.

* * * * *